United States Patent Office 3,264,397
Patented August 2, 1966

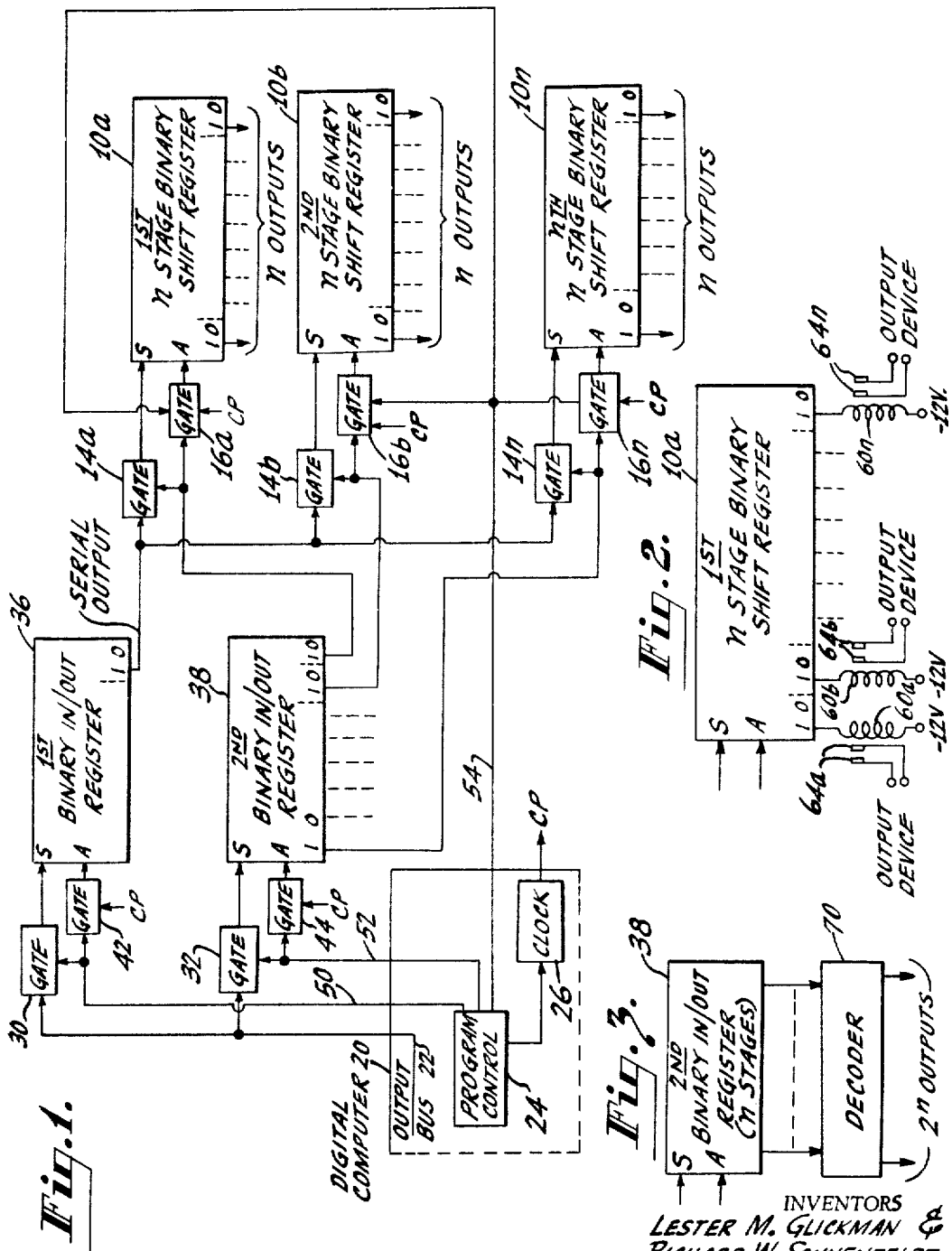

3,264,397
CONTROL SYSTEM
Lester M. Glickman, Framingham, and Richard W. Sonnenfeldt, Waban, Mass., assignors to Radio Corporation of America, a corporation of Delaware
Filed Aug. 13, 1962, Ser. No. 216,488
10 Claims. (Cl. 340—172.5)

This invention relates to control systems and, in particular, to a system for controlling the operation of a number of two-state devices, such as relays.

In process control applications which employ a digital computer, the computer output may have to drive many output devices such as relays, often several hundred or more. The relays, in turn, exercise control over the various steps of the process. These relays may be held stationary for long periods of time, but must be changed rapidly when the process requires.

It has been suggested that a separate, individually settable flip-flop be provided for each relay. Such an arrangement has the disadvantage that separate control logic is required for addressing each flip-flop circuit, with resulting high cost and space requirements. Moreover, in general, it is desired that more than one flip-flop be changed at any one time by the computer. If this cannot be done conveniently it is a serious limitation in those cases where the states of a large number of relays must be changed in a short period of time in order to exercise precise control over the process.

Accordingly, it is one object of this invention to provide an economical and high-speed system for controlling the operation of a number of two-state devices from the output of a computer.

It is another object of this invention to provide an improved control system for a number of relays, in which system the operating states of many of the relays may be changed simultaneously.

It is a further object of the invention to provide a control system for a number of relays, in which system portions of the control logic are common to a large number of the relays.

These and other objects are accomplished according to the invention by a number of $n$-stage binary shift registers, where $n$ is the number of bits in a computer word. Each relay, or other two-state device, is connected at the output of a different register stage. Information for all the relays connected to a register is contained in a first computer word, and is gated serially by bit to the proper register under the control of a second computer word.

In the accompanying drawing like reference characters refer to like components and:

FIGURE 1 is a block diagram of a control system according to the invention;

FIGURE 2 is a drawing which shows the output relays for one of the binary shift registers; and FIGURE 3 is a block diagram of a modification of the gating control portion of the invention.

In a control process, many operating functions may be performed simultaneously. Transducers are used to monitor various system parameters, and these transducers generate analog voltages which are proportional in amplitude to the parameters being monitored. These voltages may be converted to digital form and supplied as inputs to a digital computer. Digital computers have gained wide acceptance in controlling manufacturing processes because of their high-speed, real-time capabilities, high precision large memory, ease of programming, etc. Additionally, the high speed capability and programming versatility allow the computer to perform tasks other than that of process control.

In general, the computer exercises control over the process by controlling the operation of a large number of relays. The relays, in turn, control the steps in the manufacturing operation. Several hundred relays may be employed for this purpose, the exact number depending upon the complexity of the process and the precision desired. In order to use efficiently the capabilities of the computer, means must be provided for changing relay settings, when required, in the shortest possible time. Furthermore, it is desired that these changes be accomplished with as little hardware and control circuitry as possible. The manner in which these objectives are accomplished according to our invention will be clear from the following description.

In the embodiment of the invention illustrated in FIGURE 1, a maximum of $n$ binary shift registers $10a \ldots 10n$ may be provided, each shift register having $n$ stages. Only the first, second and $n^{th}$ registers are shown for convenience. Of course a fewer number of registers may be employed, depending upon the number of relays to be controlled. For example, where there are $m$ relays, $k$ shift registers are employed, where $k$ is equal to $m/n$, or is the smallest integer greater than $m/n$, when $m/n$ is not an integer. Each register has a set (S) input terminal which is connected to the input of the first stage in the register. The stages of each register are connected in known manner so that the register operates as a serial-to-parallel shift register. That is to say, information is entered into a register serially by bit and read out of the register stages in parallel, either at the (1) or (0) output terminals of the individual stages. Information is shifted one stage at a time in response to a shift pulse applied at a common advance (A) input terminal. The relays are connected either to the (1) or (0) output terminals, as illustrated in FIGURE 2, to be described.

A number of first, two-input coincidence gates $14a \ldots 14n$ is provided, one for each of the shift registers, each having its output connected to the (S) input terminal of a different shift register $10a \ldots 10n$, respectively. Each of a second set of three-input coincidence gates $16a \ldots 16n$ has its output connected to the advance (A) terminal of a different one of the shift registers $10a \ldots 10n$, respectively. A coincidence gate may be defined as one having a number of input lines and a single output line, characterized in that the voltage or signal on the output line has a predetermined amplitude and polarity only when all of the inputs to the gate are in the same prescribed state or condition. The coincidence gates $14a \ldots 14n$ are of the type which provides an output for setting the first stages of the associated registers $10a \ldots 10n$, respectively, and the second gates $16a \ldots 16n$ are of the type which provides an output for advancing the information in the registers $10a \ldots 10n$, respectively, when the inputs to those gates are both in a prescribed state, to be described.

A portion of a typical digital computer 20 is shown in block form in the lower left-hand corner of FIGURE 1. Among the many components of the computer 20 are an output bus 22, a program control unit 24 and a source 26 of multi-phase clock pulses. The output bus 22, for example, may be connected either directly, or indirectly, to the accumulator (not shown). The program control unit 24, for present purposes, may be defined as a unit which interprets the computer instructions and provides control levels to various circuits and functional devices for carrying out the instructions. Clock 26 may be a crystal-controlled pulse generator, and may provide reference pulses at one, two, or more phases, the clock pulses being designated generically "CP" in the drawing.

One input to each of a pair of two-input coincidence gates 30, 32 is connected to the output bus 22 of the computer 20. The second inputs to these gates 30 and 32 are control levels supplied by the program control unit 24. Outputs of gates 30 and 32 are applied to the set (S) input terminals of a pair of binary shift registers 36 and 38, respectively. A second pair of gates 42 and 44 is connected at the advance (A) input terminals of the registers 36 and 38, respectively. The inputs to the latter gates 42, 44 are supplied by the program control unit 24 and the clock 26.

In most computers, the RCA 110 Industrial Control Computer, for example, several high speed, input/output registers (IOR's) generally are part of the computer complex. The first and second binary registers 36 and 38 may be two of these IOR's. Second binary IOR 38 may be of the same general type as the binary shift registers 10a . . . 10n described previously, although it may have a higher operating speed capability. The first IOR 36 is the same also, except that, in the present case, information stored in this register is read out serially at the (1) output terminal of the last stage thereof.

By way of example only, the various registers 10a . . . 10n, 36 and 38 may be of the type illustrated in Figure 20–33 of the book entitled "Digital Computer and Control Engineering," by Robert S. Ledley, published 1960 by the McGraw-Hill Book Company, Inc. In such a shift register, a binary "1" signal is represented by a voltage level or pulse of zero potential, and a binary "0" is represented by a pulse or level of —12 volts. It is assumed that the computer output signals have like values and significance. The (1) output of a register stage is high (zero volts) when the stage is set and is low (—12 volts) when reset. Binary "1" signals applied to the set (S) input of a register set the first stage of the register, and binary "1" signals applied at the advance (A) input advance the information one stage for each advance signal. The various coincidence gates may be AND gates of the type illustrated in Figure 20–21 of the same book, in which case the voltage values $V_+$ and $V_-$ given in Figure 20–21 have the values of zero volts and —12 volts, respectively.

Information is entered into the input/output registers 36 and 38 under program control, serially by bit, in the following manner. The voltage on the output control line 50 of program control unit 24 goes high (to zero volts), during a first computer word time, and enables one input of each of the gates 30 and 42 associated with the first input/output register 36. A first $n$ bit computer word on output bus 22 is passed serially by bit through gate 30 to the set (S) input terminal of this register 36, and this information is advanced, or shifted, under control of the clock pulses (CP) passed through gate 42 from the clock 26. The voltage on the control line 50 drops to —12 volts after the first word is entered in the first IOR 36.

The voltage on the output control line 52 of program control unit 24 rises from —12 volts to zero volts during a second computer word time and enables one input of each of the gates 32 and 44 associated with the second input/ output register 38. A second computer word then is gated through gate 52 serially by bit to the set (S) input terminal of this register 38, and the information is advanced in the register by clock pulses from source 26 applied through gate 44. No information is entered into the first input/ output register 36 at this time because of the low level on control line 50. The voltage on control line 52 drops to —12 volts at the end of the second word time and closes the gates 32 and 44.

The computer word stored in the first IOR 36 contains the information for controlling the settings of all the relays connected to one of the binary shift registers 10a . . . 10n. It is desired that this information be supplied serially by bit to the proper one of the binary shift registers 10a . . . 10n. This is accomplished by connecting the (1) output terminal of the last stage in the first IOR 36 to one input of each of the first gates 14a . . . 14n. Which of these gates 14a . . . 14n is opened to pass the serial output of first IOR 36 is determined by the second computer word stored in second IOR 38. Essentially, the second computer word is the address of the desired one of the binary shift registers 10a . . . 10n.

Each of the (1) outputs of the second IOR 38 may be connected to the second input of a different one of the first gates 14a . . . 14n, and to one input of the corresponding one of the second gates 16a . . . 16n. In FIGURE 1, only three pairs of first and second gates are shown for convenience. It will be understood, however, that up to $n$ such pairs may be employed, and that each pair controls the inputs to a different binary shift register 10a . . . 10n. In the FIGURE 1 embodiment, only one binary "1" digit is stored in those stages of the second IOR 38 whose outputs are connected to first and second gates 14a . . . 14n and 16a . . . 16n. Accordingly, only one of the gates 14a . . . 14n is opened to pass the serial output of the first IOR 36. The corresponding second gate 16a . . . 16n is opened to pass clock pulses to the advance (A) terminal of the selected register 10a . . . 10n when the voltage on control line 54, from program control unit 24, goes high.

Assume that the binary "1" digit is stored in the last stage of the second IOR 38. The (1) output of this stage then is high, and enables one input of each of the first and second gates 14a and 16a, respectively, associated with the first binary shift register 10a. The voltage on control line 50 rises from —12 volts to zero volts during a third computer word time to partially enable gates 30 and 42. Clock pulses are passed through gate 42 and advance the information stored in the first IOR 36. A string of binary "0's" may be entered serially into the first IOR 36 during this period. Alternatively, depending upon the computer 20, a new computer word may be entered serially into the first IOR 36, which word contains information for controlling another group of relays.

The serial output of first IOR 36 passes through the enabled gate 14a to the set (S) input terminal of first binary shift register 10a. The voltage on control line 54 is high during the third word time. Accordingly, clock pulses pass through gate 16a to the advance (A) terminal of first binary shift register 10a. No shifting of information takes place in second IOR 38 at this time, however, because of the low voltage on control line 52. At the end of the third word time, the voltage on control lines 50 and 54 drop to —12 volts to disable gates 30, 42 and 16a.

In a modern digital computer, the clock rate may be on the order of one megacycle, for example. In this case, it will be seen that a 24-bit word may be entered serially into the first shift register 10a in approximately 24 microseconds. The transition time of a relay is approximately one millisecond. Hence, the relays connected at the outputs of the shift register 10a do not respond to the changes in information in the register during the 24 microsecond period when information is being shifted into the register. Thus, the transition from one word to another in a register is so fast that an energized relay will not become de-energized, and a de-energized relay will not become energized, if the same bit reappears 24 microseconds after the start of the shift cycle. As far as the relays are concerned, they cannot respond to the fast shift operation, except after its completion and only if the information stored in a stage of the register is different in the new word. That is to say, if the same bit does not reappear in a stage after the shift operation, the relay connected thereto will change its state only after approximately one millisecond following the termination of the shift operation.

The manner in which the relays 60a . . . 60n are connected at the outputs of the first binary shift register 10a is illustrated in FIGURE 2. Each relay solenoid 60a . . . 60n is connected between a different (1) output terminal of the register 10a and a source of voltage of —12 volts. As was described previously, the voltage at the (1) output terminal is —12 volts when that stage is in the reset state and is zero volts when that particular stage is set, assuming that the circuits are the same as that shown in the book aforementioned. Under these circumstances, a relay is de-energized when the particular stage is reset and is energized when that stage is set. Associated with each of the relay solenoids 60a . . . 60n is a different pair of relay contacts 64a . . . 64n, respectively, which are connected to output devices (not shown) to be controlled. Only three of the solenoids 60a, 60b and 60n are shown for convenience in FIGURE 2. It will be understood, however, that there is a total of $n$ such solenoids for the register 10a. It will also be understood that other relays are connected in a similar manner to the outputs of the other binary shift registers 10b . . . 10n.

In the particular embodiment of the invention illustrated in FIGURE 1, the output of each stage of the second IOR 38 is used to control the gates for a different binary shift register 10a . . . 10n. A total of $n$ binary shift registers 10a . . . 10n may be employed since there are $n$ bits in a computer word and, hence, $n$ stages in the second IOR 38. Assuming $n=24$, as in the case of the RCA 110 computer, there may be twenty-four shift registers 10a . . . 10n with twenty-four relays connected to each shift register, for a total of 576 relays. In the event that only a few shift registers 10a . . . 10n are required due to a small number of relays to be controlled, only a few stages of the second IOR 38 need be reserved for exercising control of the gates 14 and 16. In this case, the remaining stages of the second IOR 38 may be used to store information for other computer operations not related to relay control.

In some applications it will be necessary to control more relays than is possible in the FIGURE 1 system. Actually, the total number of relays which can be controlled, for a given computer word length, is limited only by the decoding capacity of the second IOR 38. According to another feature of the invention, illustrated in FIGURE 3, the outputs of the second input/output register 38 are supplied in parallel to a decoder 70, and the outputs of the decoder 70 are used to control the gates at the inputs to the shift registers. As is known, there may be as many as $2^n$ exclusive outputs of a decoder which has $n$ inputs. In the present case, this means over 16 million binary registers which is larger than any presently required.

The present invention has the important advantage that the first and second input/output registers 36 and 38 are common to all of the binary shift registers 10a . . . 10n, and each of the shift registers 10a . . . 10n requires only a single pair of control gates to control its operation. Thus, there is a substantial decrease in the amount of control circuitry as compared to other control systems.

What is claimed is:
1. A control system comprising:
   $m$ two-state devices to be controlled;
   $k$ binary shift registers of $n$ stages each, where $n$ is less than $m$, and where $k$ is equal to $m/n$, or is the smallest integer greater than $m/n$ when $m/n$ is not an integer;
   means connecting each two-state device to the output of a different register stage;
   a separate coincidence gate at the input of each of said registers;
   means supplying signals representing an $n$ bit binary information word serially by bit to one input of each said gate;
   and means responsive to a second binary word for enabling a second input of one of the gates.
2. The combination comprising:
   $m$ two-state devices to be controlled;
   $k$ binary shift registers of $n$ stages each, where $n$ is less than $m$, and where $k$ is equal to $m/n$, or is the smallest integer greater than $m/n$, when $m/n$ is not an integer;
   means connecting each of said devices to the output of a different register stage;
   a separate coincidence gate at the input of each of said registers;
   a source of first and second $n$ bit binary words, the first word containing information for the stages of a register and the second word containing the address of that register;
   means applying signals representing the bits of said first word serially by bit to one input of each said gate;
   and means responsive to said second word for enabling a second input of one of the gates.
3. In combination with a digital computer having a word length of $n$ bits:
   $m$ two-state devices to be controlled;
   $k$ serial-to-parallel binary shift registers of $n$ stages each, where $n<m$ and where $k=m/n$, or is the smallest integer greater than $m/n$ where $m/n$ is not an integer;
   $k$ coincidence gates each having an output connected to the input of a different one of said registers;
   means for applying signals representing the bits of a first $n$ bit computer word, serially by bit, to one input of each of said gates;
   and means responsive to a second computer word for enabling a second input of one of said gates.
4. The combination comprising:
   a plurality of binary shift registers of $n$ stages each;
   a plurality of two-state devices each connected to the output of a different register stage;
   a separate coincidence gate connected at the input of each shift register;
   a first binary input shift register for storing an $n$ bit binary information word;
   means for applying signals representing said $n$ bit word serially by bit to one input of each said gate;
   and means responsive to a second $n$ bit word for enabling a second input to one said gate.
5. The combination comprising:
   a number of binary shift registers of $n$ stages each;
   a number of two-state devices each connected to the output of a different stage;
   a separate coincidence gate connected at the input of each shift register;
   a first binary input shift register for storing an $n$ bit binary information word;
   means for applying signals representing said $n$ bit word serially by bit to one input of each said gate;
   a second binary input register for storing the address of a coincidence gate;
   and means responsive to the output of said second input register for enabling a second input to the last-mentioned coincidence gate.
6. The combination comprising:
   a number of binary output shift registers of $n$ stages each, each register having an information input terminal and a common advance terminal;
   a number of relays to be controlled, each relay being connected to the output of a different register stage;
   a number of first coincidence gates each connected to the information input terminal of a different register;
   a number of second coincidence gates each connected to the advance terminal of a different output register;
   means supplying signals representing an $n$ bit binary information word serially by bit to one input of each of said first gates;
   means for applying clock pulses to one input of each of said second coincidence gates;
   and means responsive to a second $n$ bit binary word for enabling second inputs to the first and second coincidence gates associated with one of said output registers.

7. The combination comprising:
- a plurality of serial-to-parallel binary shift registers of *n* stages each, each register having a common advance terminal;
- a number of relays each connected to the output terminal of a different register stage;
- a plurality of two-input coincidence gates each connected to the input of a different one of said registers;
- means responsive to a first *n* bit word for applying signals serially by bit to one input of each of said gates;
- means responsive to a second *n* bit word for enabling a second input of one of said gates;
- and means responsive to said second *n* bit word for applying advance pulses to the advance terminal of the register associated with said one of said gates.

8. In combination with a digital computer having a word length of *n* bits:
- a number of serial-to-parallel binary output shift registers each having *n* stages;
- a number of relays each connected to the output of a different register stage;
- a number of coincidence gates each having an output connected to the input of a different one of said output registers;
- means for applying signals representing a first computer word serially by bit to one input of each of said gates;
- a decoder connected to receive a second binary word;
- and means for connecting the second input of each of the said gates to a different output of said decoder.

9. The combination comprising:
- a number of serial-to-parallel binary output shift registers each having *n* stages;
- a number of relays each connected to the output of a different register stage;
- a number of coincidence gates each having an output connected to the input of a different output register;
- a first binary input shift register for storing an *n* bit binary information word for one of said registers;
- a second binary input register for storing the address of said one of said registers;
- means for applying signals representing the bits stored in said first input register serially by bit to one input of each of said gates;
- and means responsive to the address stored in said second input register for enabling the second input to the gate associated with said one of said registers.

10. The combination comprising:
- a number of serial-to-parallel binary output shift registers each having *n* stages, each register having a common advance signal terminal;
- a number of relays each connected to the output of a different register stage;
- a number of first coincidence gates each having an output connected to the input of a different output register;
- a number of second coincidence gates each having an output connected to a different said advance terminal;
- a first binary input shift register for storing an *n* bit binary information word for one of said registers;
- a second binary input register for storing the address of said one of said registers;
- means for applying signals representing the bits stored in said first input register serially by bit to one input of each of said first gates;
- means for applying clock pulses to one input of each of said second gates;
- and means responsive to the address stored in said second input register for enabling second inputs to the first and second gates associated with said one of said registers.

References Cited by the Examiner
UNITED STATES PATENTS 3,015,806  1/1962  Wang et al. _____ 340—147

ROBERT C. BAILEY, *Primary Examiner.*

MALCOLM A. MORRISON, *Examiner.*

R. M. RICKERT, *Assistant Examiner.*